HIGH VACUUM COLD TRAP

Original Filed March 13, 1964

INVENTORS
DANIEL G. BILLS
KEITH A. WARREN
BY
Cushman, Darby & Cushman
ATTORNEYS

United States Patent Office

Re. 26,973
Reissued Oct. 27, 1970

26,973
HIGH VACUUM COLD TRAP

Daniel G. Bills and Keith A. Warren, Boulder, Colo., assignors to Granville-Phillips Company, Boulder, Colo., a corporation of Washington Original No. 3,304,731, dated Feb. 21, 1967, Ser. No. 351,689, Mar. 13, 1964. Application for reissue July 23, 1968, Ser. No. 754,507
Int. Cl. B01d *5/00*
U.S. Cl. 62—55.5 14 Claims

Matter enclosed in heavy brackets [ ] appears in the original patent but forms no part of this reissue specification; matter printed in italics indicates the additions made by reissue.

This invention relates to devices for preventing the return of diffusion pump fluids into a vacuum system and, more specifically, to high vacuum cold traps.

Diffusion pumps provide one of the fastest and most efficient ways of evacuating systems designed to operate at extremely low pressures and these pumps are, therefore, widely used for this purpose. One serious problem results from the use of this type of pump and that is the return-flow of the pumping fluid to the system being evacuated. To prevent return-flow and enable the diffusion pump to take the system down to its ultimate possible pressure, extremely efficient trapping must be provided ahead of the pump. Obviously, the design and effectiveness of the trap becomes more critical as the system pressures move into the ultra-high vacuum range and the systems themselves must be kept free of contaminants.

Trapping alone can be achieved rather simply provided one is satisfied with minimal conductance. The optimum trap, on the other hand, provides both maximum trapping and maximum conductance at reasonable cost. The prior art attempts to design such a trap have met with little success, however.

The available traps all have a common deficiency and that is their failure to prevent oil from passing from the pump back into the system. This can occur in any one of several ways. For example, if a room temperature path exists between the ends of a trap, the oil will slowly creep along this warm surface and eventually evaporate into the clean system. Morecules of oil can also bounce off of warm surfaces inside the trap and rebound into the clean system thus contaminating same. It is even possible for one oil molecule to bounce off another and pass into the clean system without ever contacting any surface of the trap unless well-designed baffles are provided and the latter are likely to lower conductance.

In general, surface migration and contamination resulting from molecules bouncing off the trap walls can be effectively prevented by maintaining all interior surfaces at the temperature of liquid nitrogen or thereabouts. Intermolecular collisions are also no problem provided these colliding molecules must rebound against one or more cold wall surfaces before they can emerge from the trap. Actually, at very low pressures, molecule-molecule collisions occur infrequently and molecule-wall collisions predominate.

One of the major sources of system contamination is the release of previously trapped molecules rather than the direct back-flow thereof in one of the ways just described. Nitrogen and oxygen molecules, for instance, are relatively loosely held on a liquid nitrogen cooled surface and a change in wall temperature of only a degree will release some of these trapped gas molecules back into the system. Most of the prior art traps are designed with the idea in mind of keeping all interior wall surfaces at the same temperature when, in accordance with the teaching of the present invention, this is not nearly as important as preventing the various cooled surfaces from changing temperature even though they are not all at the same temperature. It is also important to prevent warm gases from coming into contact with the refrigerated surfaces of the trap because this causes localized heating, yet, most commercially available traps are so designed that this takes place while the trap is being filled.

From the above it will be apparent that a well-designed trap should provide a structure whereby the temperature of all trapping surfaces remains constant or nearly so over extended periods of use and the conductance path by which heat is transferred to the coolant are arranged to conserve the latter as long as possible. These and other desirable ends are accomplished in accordance with the teaching of the instant invention by providing a coolant reservoir with a double interior wall that emerges as an exterior wall along a junction quite remote from any surface in direct contact with the coolant thus producing a long heat leak path that prevents rapid evaporation. More significant, however, is the feature of the double-walled reservoir that keeps the various areas of the trapping surface at a substantially constant, but not necessarily the same, temperature until the coolant level in the reservoir falls below the juncture between this exposed interior wall and the covered interior wall in direct contact with the coolant. Also, the location of the fill opening in combination with this double-walled coolant reservoir is such as to prevent warm room air from coming into direct contact with the trapping surfaces.

It is, therefore, the principal object of the present invention to provide a novel and improved high vacuum cold trap.

A second object is the provision of a device of the type aforementioned that combines the desirable characteristics of essentially complete trapping with near maximum conductance.

Another objective is to provide a cold trap designed to maintain all trapping surfaces at essentially constant temperatures during the entire period the system is being evacuated.

Still another objective of the invention herein claimed is the provision of a liquid nitrogen cooled trap that conserves the coolant several times longer than prior art traps.

An additional object is to provide a cryogenic vessel in which the loss of coolant and accompanying decrease in fluid coolant level has little or no effect on trapping efficiency.

Further objects of the invention are the provision of a cold trap of the type used with diffusion pumps that is simple to construct, inexpensive, compact, versatile, easy to operate, relatively rugged and one capable of preventing back-flow of contaminants into the clean system to the degree required for ultra-high vacuum operation.

Other objects will be in part apparent and in part pointed out specifically hereinafter in connection with the description of the drawings that follow, and in which.

Figure 1:
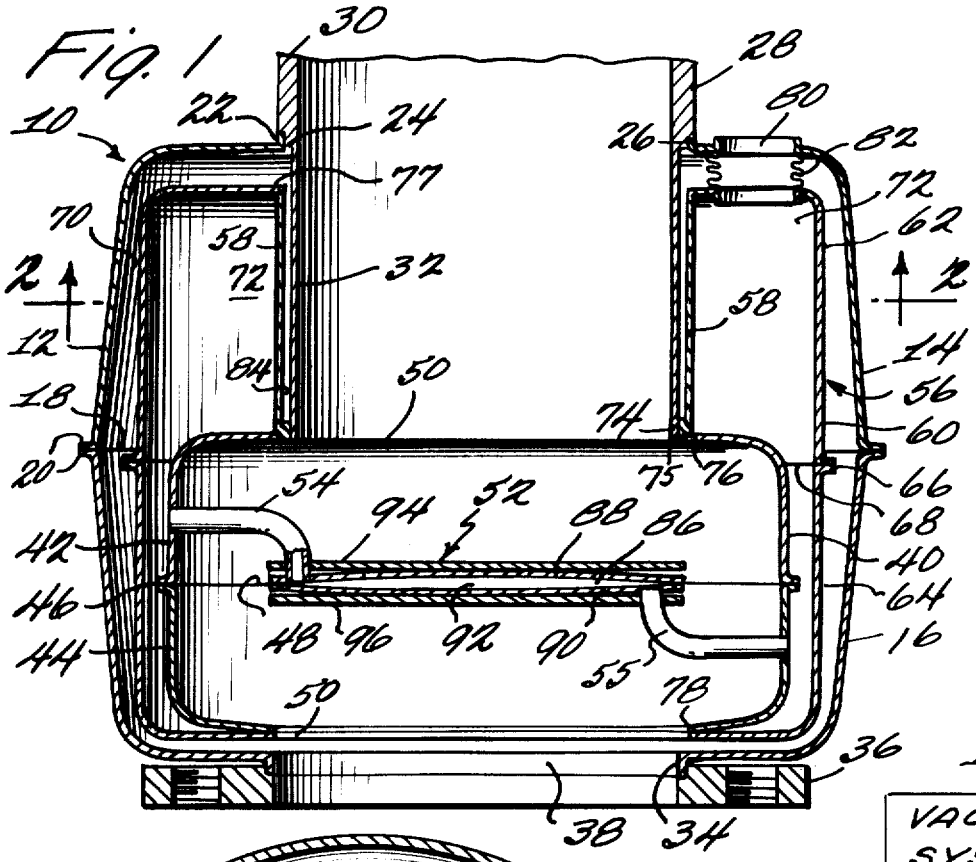
FIGURE 1 is a diametrical section showing the details of construction of the high vacuum cold trap of the present invention.
Figure 2:
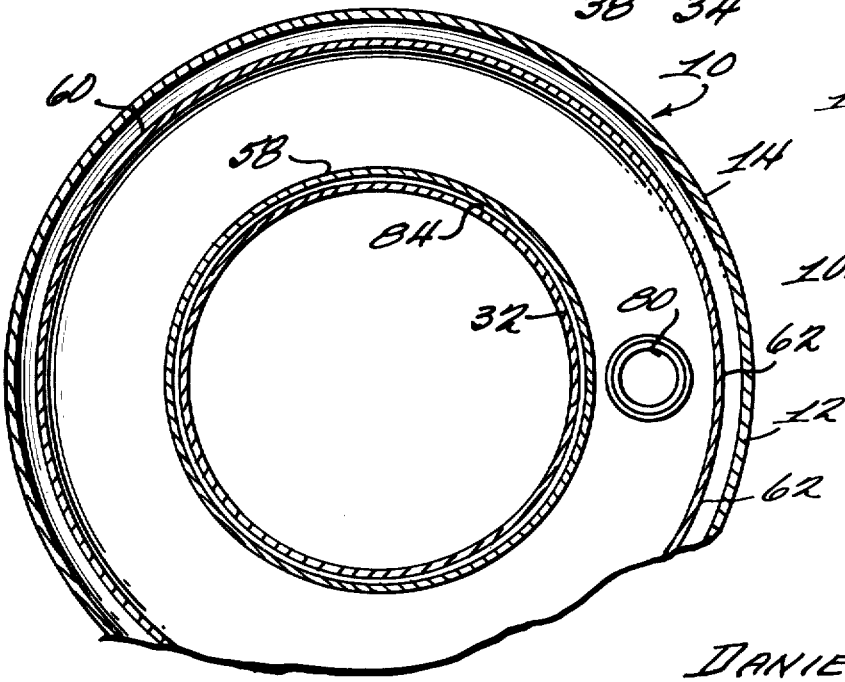
FIGURE 2 is a transverse section taken along line 2—2 of FIGURE 1.

Referring now to the drawings for a detailed description of the cold trap that forms the subject matter of the present invention and which has been broadly designated by reference numeral 10, it will be seen to include an outer shell 12 formed from upper and lower substantially identical open-bottomed cup-shaped sections 14 and 16 that are fastened together along seam 18 formed by adjoining out-turned flanged edges 20. The upper edge 22 of upper section 14 that borders the central opening 24 therein is secured to the external annular shoulder 26 of tubular element 28, said shoulder defining the junction between the thick wall section 30 and the thin wall section 32. Tubular element 28 forms the intake into the trap and is connected into the system to be evacuated by conventional means not shown.

The edge 34 of the lower section 16 which corresponds to edge 22 of the upper section 14 is similarly secured to a flange 36 that borders central opening 38. This flange is fastened in a manner well known in the art to a diffusion pump which has also been omitted from the drawings because it forms no part of the present invention.

At the lower extremity of tubular element 28 is positioned an inner shell 40 having a shape similar to that of outer shell 12 except that it is about half as high and is substantially smaller in diameter. Shell 40 does, however, include two open-bottomed identical cup-shaped sections 42 and 44 fastened together along their flanged adjoining edges 46 to form joint 48. Both upper section 42 and lower section 44 include central openings 50, the one in the upper section receiving the lower extremity of tubular element 28 as shown.

This inner shell 40 constitutes the primary trapping surface and is fitted with a circular refrigerated baffle assembly 52 supported in the center thereof between openings 50 by inlet and outlet conduits 54 and 55 open into the interior of the coolant reservoir. The diameter of the baffle assembly 52 is approximately the same as openings 50 in the inner shell and it is readily apparent that no contaminating oil molecules could pass directly from the diffusion pump side of the trap where flange 36 is located upwardly into tubular element 28 without striking either the baffle assembly or one of the walls of inner shell 40 that constitute the primary trapping surfaces.

Now, the most important feature of the present invention lies in the structure and location of the coolant reservoir in relation to the parts previously described. This coolant reservoir has been broadly designated by reference numeral 56 and will be seen to include as a part thereof inner shell 40 together with a tubular wall portion 58 and an intermediate shell 60 that is, once again, formed by substantially identical upper and lower open-bottomed cup-shaped sections 62 and 64 that are connected together at their adjacent flanged edges 66 to form joint 68. This intermediate shell 60 is somewhat smaller than the outer shell leaving an open space or cavity 70 therebetween which is customarily evacuated to better insulate the coolant reservoir 56 before the coolant is placed therein. This intermediate shell also lies in spaced relation on the outside of the inner shell 40 to define the cavity 72 into which the coolant is placed.

Tubular wall portion 58 of the coolant reservoir encircles the thin wall section 32 of tubular element 28 and lies in spaced relation on the outside thereof except where these two concentric tubes are connected together along their lower edges to form joint 74. The edge 76 of the upper section 42 of inner shell 40 that borders the central opening 50 therein is also connected to the lower edge of tubular wall 58 at joint 75.

The upper edge of wall 58 is joined to the upper section 62 of the intermediate shell 60 along seam 77. The lower edge of the lower sections of both the inner and intermediate shells ars similarly joined together at 78 to produce a mass spectrometer leak-tight seam as are all of the seams and joints previously described. Thus, an examination of FIGURE 1 will reveal that the coolant reservoir 56 comprises the interior surfaces of the intermediate shell and the exterior surfaces of the inner shell and outer tubular wall member 58.

Adjacent surfaces of the intermediate and outer shells at the top of the coolant reservoir are provided with fill openings 80 that are interconnected across cavity 70 by a bellows 82. This bellows is, of course, provided with a suitable gas-flow restriction device that has not been illustrated.

With specific reference to FIGURE 1, the baffle assembly 52 will be seen to include a second coolant reservoir 86 formed by a pair of slightly convex circular plates 88 and 90, joined together along their peripheral edges in a manner to define a coolant cavity 92 therebetween. As the main reservoir 56 is being filled with coolant, the coolant also flows into the coolant cavity 92 of the baffle assembly through conduit 55 and is vented through conduit 54. This baffle assembly also includes a pair of plane circular disks 94 and 96 of substantially the same diameter as the second reservoir that are spot-welded to the top and bottom of the latter at the center where they make essentially point contact with one another. These disks 94 and 96 are quite thin and cooperate to define secondary trapping surfaces that are refrigerated and maintained at a substantially constant temperature.

In use, the upper end of tubular element 28 represented by the thickened wall section 30 is connected into the high vacuum system being evacuated while flange 36 is similarly attached to a diffusion pump resulting in a closed leak-tight system capable of sustaining low pressures in the high and ultra-high vacuum range as these terms are commonly used. For best results, a substantial vacuum is drawn in the system before the cryogenic liquid is introduced as this evacuates cavity 70 between the outer and intermediate shells providing better insulation for the coolant reservoir by preventing heat transfer by air conduction between these shells. Once this has been accomplished, the cryogenic liquid is introduced into the coolant reservoir through the fill openings 80 until the reservoir is full, whereupon, the reservoir is loosely capped. The coolant lies in direct contact with the inner shell and outer tubular wall 58 but does not contact the thin section 32 of inner tubular element 28, the latter surface being cooled by conduction across joint 74 which lies about halfway down in the reservoir and is also underneath by far the greater volume of coolant when the reservoir is full. Now, thin wall section 32 of the inner tubular element 28 constitutes the secondary trapping surface of the unit and, while all areas of this thin-walled section will not be at exactly the same temperature due to the closer proximity of the lower part to the cooled joint 74, these temperatures will not change significantly until the fluid level of the coolant is reservoir 56 falls below this seam or joint where the inner and outer tubular walls and inner shell all meet. Conversely, a long heat conductivity path is provided by thin-walled section 32 that requires heat reaching the coolant by direct conduction to enter at shoulder 26 and travel all the way down this inner tubular wall before being transferred to the reservoir. Of course, wall sections 58 and 32 have an evacuated space 84 therebetween that effectively prevents the transfer of heat therebetween that does not migrate across joint 74, the heat transfer by radiation being minimal.

The above-described simple, but novel, features contribute to the production of a cold trap which provides maximum trapping without materially reducing conductance. The cooled primary and secondary trapping surfaces greatly decrease the chances of an oil molecule rebounding and it can be shown that an average molecule must make about seven such collosions with a cooled surface to pass clear through the instant trap thus decreasing the probability that one will do so to the point where it becomes negligible.

Figure 3:
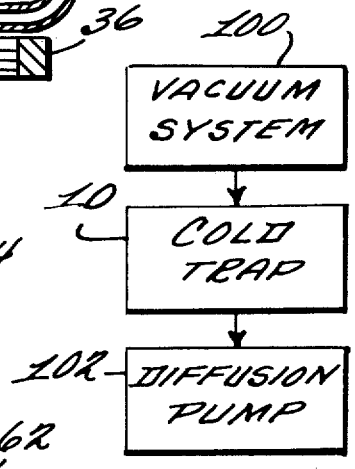
*FIGURE 3 is a block diagram of an illustrative embodiment of a system in accordance with the invention.*

*Referring to FIGURE 3, the cold trap 10 is shown in operative relation to a typical vacuum system 100 and a diffusion pump 102.*

Having thus described the several useful and novel features of the high vacuum cold trap of the present invention, it will be apparent that the many worthwhile objectives for which it was designed have been achieved. Although but a single specific embodiment of the invention has been illustrated and described, we realize that certain changes and modifications therein may well occur to those skilled in the art within the broad teaching hereof; hence, it is our intention that the scope of protection afforded hereby shall be limited only insofar as said limitations are expressly set forth in the appended claims.

What is claimed is:

1. A trap for use between a diffusion pump and a closed system being evacuated thereby for preventing the return of pumping fluids into the system which comprises: an outer gas-impervious shell having an inlet opening in the top and an outlet opening in the bottom, a tubular neck attached to the outer shell in leak-tight relation and in position to provide portions projecting both externally and internally from said inlet opening, the externally projecting neck portion being adapted for connection into the system to be evacuated and the internally projecting portion terminating in a free edge located inside the outer shell remote from the leak-tight joint therebetween, connecting means carried by the outer shell bordering the outlet opening therein adapted for leak-tight attachment to a diffusion pump, an inner gas-impervious shell suspended wholly within the outer shell and in spaced relation thereto by means of the internally-located free edge of the tubular neck to which said inner shell is fastened with a leak-tight joint, said inner shell having an opening in the top thereof communicating the interior of the neck and an opening in the bottom aligned with the outlet opening of the outer shell, a baffle assembly supported within the inner shell in spaced relation to the walls thereof and between the top and bottom openings adapted to block straight-line flow through said inner shell, a tubular wall having a bottom edge fastened to the free edge of the internally-projecting tubular neck portion and projecting upwardly therefrom in encircling spaced relation, said tubular wall having an upper edge terminating inside the outer shell in spaced relation to the latter, an intermediate gas-impervious shell located between the inner and outer shells, said intermediate shell being fastened to the upper edge of the tubular wall and the lower end of the inner shell adjacent the bottom opening therein so as to define with said inner shell and wall a leak-tight coolant reservoir adapted to receive a cyrogenic fluid, and said intermediate shell lying in spaced relation to the outer shell so as to provide a chamber surrounding the coolant reservoir that can be evacuated through the outlet opening, and conduit means connecting the top of the coolant reservoir with the exterior of the outer shell for filling purposes, and wherein the joint between the internally-projecting portion of the tubular neck and the bottom edge of the tubular wall is located below the major volume of the coolant reservoir and provides a conductance path extending from said joint located a substantial distance beneath the coolant level in the reservoir to the externally-projecting neck portion whereby the internally-projecting neck portion is cooled.

2. The trap as set forth in claim 1 in which the annular space between the inwardly projecting portion of the tubular neck and the encircling tubular wall communicates the chamber surrounding the coolant reservoir between the intermediate and outer shells so that said annular space can be evacuated along with said chamber to insulate the reservoir.

3. A gas and liquid impervious leak-tight trap for use between a diffusion pump and a closed system being evacuated thereby which comprises: first and second continuous annular wall elements joined together along their upper and lower margins to define a hollow sealed coolant reservoir having a central flow passage therethrough, the first wall element providing the inside reservoir surface and having an annular section of increased diameter adjacent the lower end thereof that produces an enlargement in the bottom of the central flow passage, a third continuous annular wall element joined to the first annular wall element at the top of the enlargement in the flow passage and extending upwardly beyond said first wall element in spaced relation inside thereof, the top of the third annular wall element being adapted for connection into a sealed system to be evacuated, a baffle assembly mounted in the enlargement of the central flow passage in position to block straightline flow through the latter while permitting unrestricted flow along the first wall element, a fourth continuous annular wall element having its upper edge connected to the third wall element to form a sealed joint located in spaced relation above the juncture between the upper margins of the first and second wall elements, the fourth wall element having its lower edge adapted for connection to a diffusion pump, and said fourth wall element lying in encircling spaced relation to the second wall element while coperating therewith to define an annular cavity capable of insulating the coolant reservoir when evacuated, and means comprising a plugable conduit interconnecting opposed portions of the second and fourth wall elements at the top of the reservoir for introducing a cyrogenic coolant therein, wherein the baffle assembly comprises, a second coolant reservoir formed by a pair of convex circular plates joined together along their peripheral edges to define a coolant cavity therebetween, first and second substantially planar disks attached to the top and bottom of the second reservoir at the center thereof in a manner to make essentially point contact therewith, an intake conduit connecting the first coolant reservoir with the second adapted to provide gravity-flow into the latter, and an outlet conduit connecting said second coolant reservoir with the first adapted to provide gravity discharge into the latter.

4. A cold trap for use between a diffusion pump and a closed system to be evacuated thereby which comprises: a gas-impervious shell having sidewalls forming a gas flow passage therethrough with an inlet opening in the top for connection to a system and an outlet opening in the bottom for connection to a pump; a coolant reservoir having inner and outer walls surrounding said shell with that portion of the inner wall of the coolant reservoir surrounding the lower portion of said flow passage being contiguous with the lower portion of said shell sidewalls which define a lower contiguous wall portion while that portion of the inner wall of the coolant reservoir surrounding the upper portion of the flow passage is spaced from the upper portion of said shell sidewalls which define an upper spaced wall portion serially connected to said contiguous wall portion, said coolant reservoir being of a configuration and having a normal coolant level such that the major portion of the coolant volume is located above the junction between the lower contiguous wall portion and the upper spaced wall portion of said flow passage, said upper wall portion of said shell, spaced from said inner reservoir wall, extending upwardly from said contiguous wall portion and terminating above the normal liquid level of coolant in the reservoir to provide a heat conductance path from said contiguous wall portion along the entire length of the spaced wall portion to the upper extremity of the trap; conduit means for introducing a cyrogenic coolant into said reservoir; and, baffle means positioned in said shell within the flow passage wherein a substantial portion of the total surface area of said flow passage forms a portion in common with the surface of said coolant reservoir and wherein the remaining portion of said total surface area of said flow passage is spaced from the surface of said reservoir defining the major portion of the total volume of said coolant reservoir.

*5. A cold trap for use between a pump and a system to be evacuated, said trap comprising:*

*an outer shell connected between said pump and said system;*

*a coolant reservoir disposed within the outer shell;*

*means for supporting the reservoir extending between said outer shell and said reservoir and connected to said reservoir below a major volume of the reservoir;*

*and said coolant reservoir being disposed between the outer shell and the extended supporting means.*

*6. A cold trap as in claim 5 where the connection between said supporting means and said reservoir is disposed approximately at the bottom of said supporting means and a point substantially removed from the bottom of said reservoir.*

*7. A cold trap as in claim 5 where said supporting means includes an inwardly projecting, tubular neck connected to said shell.*

*8. A cold trap as in claim 7 where said coolant reservoir is annular in shape and comprises inner and outer walls, said tubular neck being connected to said inner wall.*

*9. A cold trap as in claim 10 including conduit means connecting the top of the coolant reservoir with the exterior of the outer shell for filling purposes.*

*10. A cold trap as in claim 9 including baffle means disposed within and supported by the inner wall of said reservoir.*

*11. A cold trap for use between a pump and a system to be evacuated,*

*an outer gas-impervious shell having an inlet opening in the top for connection to said closed system and an outlet opening in the bottom for connection to said pump;*

*a tubular neck attached to the outer shell in leak-tight relation and projecting internally into said shell; said neck terminating in a free edge located inside the outer shell remote from said leak-tight joint;*

*a coolant reservoir suspended wholly within the outer shell and in spaced relation thereto so as to provide a chamber that can be evacuated through the outlet opening of said outer shell, said reservoir having inner and outer walls, the inner wall of said reservoir being connected to said free edge of the tubular neck;*

*wherein the connection between the tubular neck and the reservoir is located below the major volume of the reservoir and wherein a conductance path is provided from said outer shell to said connection through said tubular neck whereby the temperature gradient along said neck is maintained substantially constant as the coolant level in said reservoir is decreased.*

*12. A cold trap as in claim 11 where the connection between said tubular neck and said reservoir is disposed approximately at the bottom of said tubular neck and a point substantially removed from the bottom of said reservoir.*

*13. A cold trap as in claim 5 where said supporting means is substantially closed to prevent any trapped gases from directly escaping from the major volume portion of the reservoir past said support means into said system to be evacuated as the coolant level in said reservoir decreases.*

*14. A cold trap as in claim 11 where said tubular neck is substantially closed to prevent any trapped gases from directly escaping from the major volume portion of the reservoir past said support means into said system to be evacuated as the coolant level in said reservoir decreases.*

References Cited

The following references, cited by the Examiner, are of record in the patented file of this patent or the original patent.

UNITED STATES PATENTS

| | | | |
|---|---|---|---|
| 1,845,247 | 2/1932 | Davidson | 62—55.5 |
| 2,594,232 | 4/1952 | Stockstill | 165—171 |
| 3,044,275 | 7/1962 | Drewes | 55—269 X |
| 3,081,068 | 3/1963 | Milleron | 55—269 X |
| 3,137,551 | 6/1964 | Mark | 55—269 |
| 3,144,756 | 8/1964 | Arnold et al. | 55—268 X |
| 3,166,915 | 1/1965 | Klipping | 62—169 |
| 3,188,785 | 6/1965 | Butler | 55—269 |
| 3,232,031 | 2/1966 | Simons | 55—269 |
| 3,321,927 | 5/1967 | Hood | 62—55.5 |
| 3,416,326 | 12/1968 | Stuffer | 62—55.5 |

FOREIGN PATENTS

| | | |
|---|---|---|
| 936,689 | 9/1963 | Great Britain. |

WILLIAM J. WYE, Primary Examiner

U.S. Cl. X.R.

55—267, 389; 62—45